US010989914B2

United States Patent
Ramsey et al.

(10) Patent No.: US 10,989,914 B2
(45) Date of Patent: Apr. 27, 2021

(54) HYBRID LIDAR SYSTEM

(71) Applicant: Goodrich Corporation, Charlotte, NC (US)

(72) Inventors: Scott W. Ramsey, Northbridge, MA (US); Jonathan C. Jarok, Chelmsford, MA (US); James B. Johnson, Reading, MA (US)

(73) Assignee: Goodrich Corporation, Charlotte, NC (US)

(*) Notice: Subject to any disclaimer, the term of this patent is extended or adjusted under 35 U.S.C. 154(b) by 459 days.

(21) Appl. No.: 15/832,014

(22) Filed: Dec. 5, 2017

(65) Prior Publication Data

US 2019/0171003 A1 Jun. 6, 2019

(51) Int. Cl.
*G02B 26/08* (2006.01)
*G01S 7/4865* (2020.01)
*G06T 7/30* (2017.01)
*G01S 7/481* (2006.01)
*G01S 17/10* (2020.01)
*G02B 26/10* (2006.01)
*G01S 17/42* (2006.01)

(52) U.S. Cl.
CPC ........ *G02B 26/0883* (2013.01); *G01S 7/4816* (2013.01); *G01S 7/4817* (2013.01); *G01S 7/4865* (2013.01); *G01S 17/10* (2013.01); *G01S 17/42* (2013.01); *G02B 26/108* (2013.01); *G06T 7/30* (2017.01)

(58) Field of Classification Search
None
See application file for complete search history.

(56) References Cited

U.S. PATENT DOCUMENTS

| 8,072,581 B1* | 12/2011 | Breiholz | G01S 7/51 356/5.01 |
|---|---|---|---|
| 8,493,445 B2 | 7/2013 | Degnan, III et al. | |
| 9,696,722 B1 | 7/2017 | Ulrich et al. | |
| 10,197,791 B2* | 2/2019 | Choiniere | G02B 26/08 |

(Continued)

FOREIGN PATENT DOCUMENTS

EP 3056856 A1 8/2016

OTHER PUBLICATIONS

Siegwart Bogatscher, Andreas Streck, Maik Fox, Sebastian Meinzer, Nico Heussner, and Wilhelm Stork, "Large aperture at low cost three-dimensional time-of-flight range sensor using scanning micromirrors and synchronous detector switching" (Year: 2014).*

(Continued)

*Primary Examiner* — Yuqing Xiao
*Assistant Examiner* — Amir J Askarian
(74) *Attorney, Agent, or Firm* — Locke Lord LLP; Joshua L. Jones; Scott D. Wofsy

(57) ABSTRACT

A hybrid LIDAR system 100 includes a flash-based LIDAR detector array. A broad laser emitter is operatively connected to the LIDAR detector array for flash-based LIDAR sensing. A first beam steering mechanism is operatively connected with the broad laser emitter for scanning a scene with a broad beam from the broad laser emitter. A second beam steering mechanism is operatively connected with the LIDAR detector array for directing returns of the broad beam from the scene to the LIDAR detector array.

9 Claims, 1 Drawing Sheet

(56) References Cited

U.S. PATENT DOCUMENTS

| | | | |
|---|---|---|---|
| 2011/0075234 A1* | 3/2011 | Ullman | F41H 13/0062 |
| | | | 359/221.2 |
| 2011/0285981 A1* | 11/2011 | Justice | G01S 17/87 |
| | | | 356/4.01 |
| 2014/0008549 A1* | 1/2014 | Theriault | G02B 26/105 |
| | | | 250/459.1 |
| 2015/0055078 A1* | 2/2015 | Johnstone | G02B 3/0081 |
| | | | 349/200 |
| 2015/0350569 A1 | 12/2015 | Espersen et al. | |
| 2018/0164408 A1* | 6/2018 | Hall | A61K 36/52 |
| 2018/0251865 A1* | 9/2018 | Dajnowski | B08B 7/0042 |
| 2019/0041518 A1* | 2/2019 | Spickermann | G01S 17/93 |

OTHER PUBLICATIONS

Round Wedge Prisms (Year: 2016).*
Siegwart Bogatscher et al., "Large Aperture at Low Cost Three-Dimensional Time-of-Flight Range Sensor Using Scanning Micromirrors and Synchronous Detector Switching", Applied Optics, Optical Society of America, Washington, DC., vol. 53, No. 8, Mar. 10, 2014, pp. 1570-1582.
Extended European Search Report dated May 7, 2019, issued during the prosecution of European Patent Application No. 18210461.2.

* cited by examiner

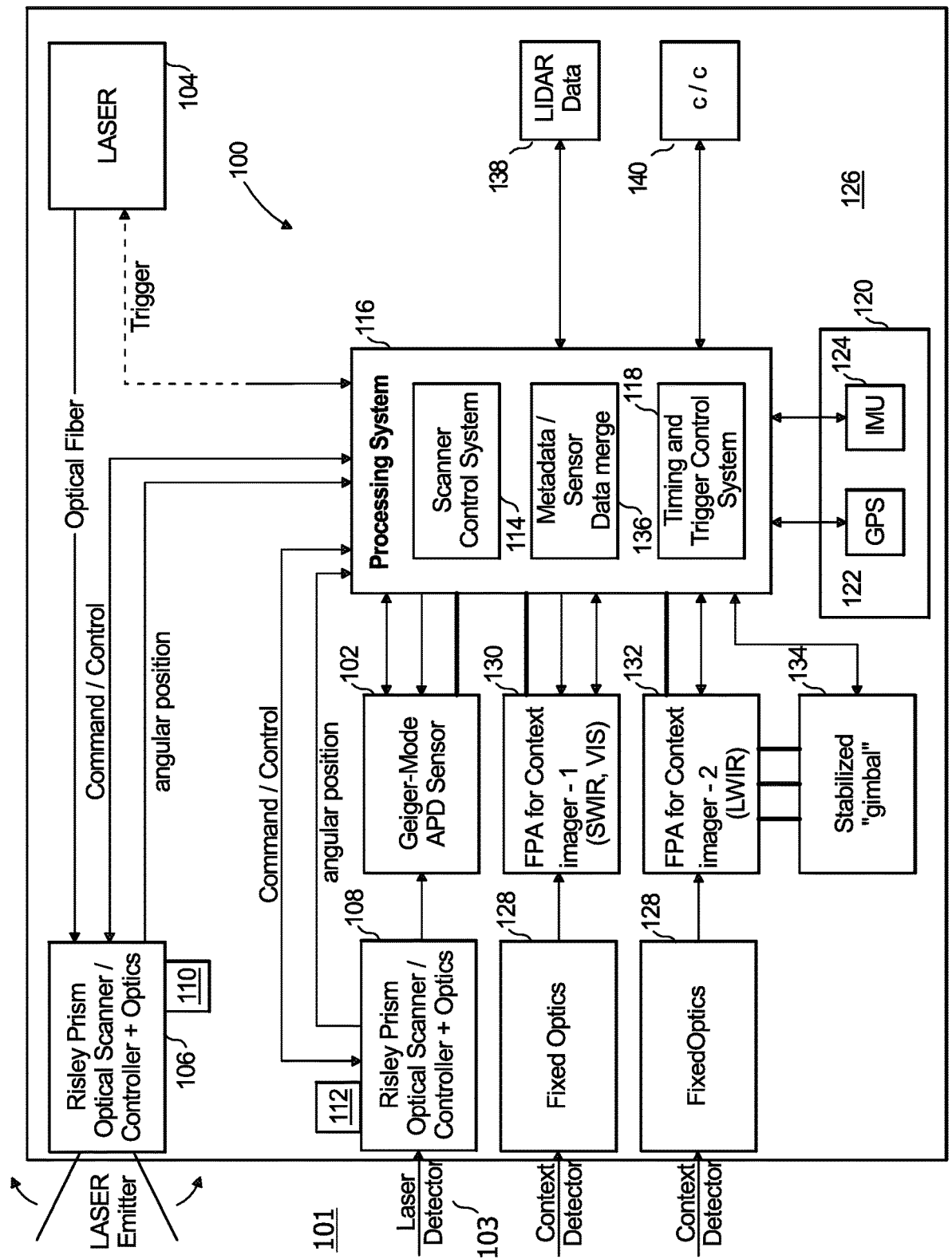

HYBRID LIDAR SYSTEM

BACKGROUND OF THE INVENTION

1. Field of the Invention

The present disclosure relates to sensor systems, and more particularly to LIDAR/LADAR systems.

2. Description of Related Art

Traditional flash-based (array) LIDAR has a fixed field-of-view (FOV). Scanning point LIDAR systems can have a better FOV but have difficulty with point to point correlation due to limits of geo-registration systems. Gimbal-based scanning with an array sensor is restricted to slow scans due to the mass of the sensor. This limits a flash-based LIDAR sensor's utility for high speed, high FOV operations such as required by collision avoidance systems.

The conventional techniques have been considered satisfactory for their intended purpose. However, there is an ever present need for improved sensor systems. This disclosure provides a solution for this need.

SUMMARY OF THE INVENTION

A hybrid LIDAR system 100 includes a flash-based LIDAR detector array. A broad laser emitter is operatively connected to the LIDAR detector array for flash-based LIDAR sensing. A first beam steering mechanism is operatively connected with the broad laser emitter for scanning a scene with a broad beam from the broad laser emitter. A second beam steering mechanism is operatively connected with the LIDAR detector array for directing returns of the broad beam from the scene to the LIDAR detector array.

The first beam steering mechanism can include a first rotating prism, and the second beam steering mechanism can include a second rotating prism that is co-aligned with the first rotating prism. The first beam steering mechanism can include a first Risley prism pair for steering the beam from the broad laser emitter over a conical field of regard, and the second beam steering mechanism can include a second Risley prism pair that is co-aligned with the first Risley prism pair for directing returns of the broad beam from the seen to the LIDAR detector array. A position measuring system can be operatively connected to at least one of the first beam steering mechanism and/or the second beam steering mechanism for generating positional data to associate with returns of the broad beam detected by the LIDAR detector array.

An alignment controller can be operatively connected to the first beam steering mechanism and to the second beam steering mechanism to maintain alignment of the LIDAR detector array and the broad laser emitter. A LIDAR controller can be operatively connected to the LIDAR detector array and to the broad laser emitter for controlling LIDAR actuation. An inertial navigation system (INS) can be operatively connected to the LIDAR detector array for generating geo-location data to associate with returns of the broad beam. A real-time computer can be operatively connected to the LIDAR detector for alignment of metadata with received LIDAR data.

A hybrid LIDAR system includes a platform. A flash-based LIDAR detector array is mounted to the platform. A broad laser emitter is mounted to the platform and is operatively connected to the LIDAR detector array for flash-based LIDAR sensing. A first Risley prism pair is mounted to the platform and is optically coupled to the broad laser emitter for scanning a scene with a broad beam from the broad laser emitter. A second Risley prism pair is mounted to the platform and is optically coupled to the LIDAR detector array for directing returns of the broad beam from the scene to the LIDAR detector array. At least one controller is operatively connected to the first and second Risley prism pairs to maintain alignment of the LIDAR detector array and the broad laser emitter and to control LIDAR actuation. At least one sensor subsystem is operatively connected to the platform for generating metadata associated with returns of the broad beam detected by the LIDAR detector array. A real-time computer is operatively connected to the at least one sensor subsystem and to the LIDAR detector array to associate metadata from the at least one sensor subsystem with LIDAR data from the LIDAR detector array.

A method of generating LIDAR data includes directing a laser beam from a wide beam laser emitter through a first beam steering mechanism to scan a scene. The method includes directing returns of the laser beam from the scene with a second beam steering mechanism to a LIDAR detector array, generating time of flight data for returns of the laser beam for a plurality of detector points in the LIDAR detector array for each pulse of the laser beam, detecting positional data regarding the first and second beam steering mechanisms, and associating the positional data with the time of flight data to generate LIDAR data.

Directing a laser beam can include steering the laser beam with the beam steering mechanism over a conical field of regard. The first beam steering mechanism can include a first Risley prism pair, the second beam steering mechanism can include a second Risley prism pair that is co-aligned with the first Risley prism pair, and detecting positional data can include detecting prism positions for at least one prism in the first and second Risley prism pairs.

The method can include controlling the first and second beam steering mechanisms to maintain alignment of the LIDAR detector array and the broad laser emitter. The method can include controlling LIDAR actuation with a LIDAR controller operatively connected to the LIDAR detector array and to the broad laser emitter. The method can include associating geo-location data with the LIDAR data to generate a raw 3-d point cloud with all metadata required for geo-registration of detected LIDAR points. The method can includes obtaining the geo-location data from an inertial navigation system (INS) operatively connected to the LIDAR detector array. The method can include associating metadata with the LIDAR data using a real-time computer operatively connected to the LIDAR detector.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain FIGURES, wherein:

FIG. 1 is a schematic view of an exemplary embodiment of a system constructed in accordance with the present disclosure, showing the laser emitter, the LIDAR detector array, and the Risley prisms for beam steering.

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an exemplary embodiment of a system in accordance with the disclosure is shown in FIG. 1 and is designated generally by reference character 100. The systems and methods described herein can be used to generate geo-registered points which can be combined into a point cloud, e.g., for use in operating aircraft including unmanned air vehicles, piloted vehicles, and optionally piloted vehicles.

A hybrid LIDAR system 100 includes a flash-based LIDAR detector array 102, e.g., a Geiger-mode APD sensor. A broad laser emitter 104 is operatively connected to the LIDAR detector array 102 for flash-based LIDAR sensing. A first beam steering mechanism 106 is operatively connected with the broad laser emitter 104, e.g., by an optical fiber, for scanning a scene 101 with a broad beam from the broad laser emitter 104. A second beam steering mechanism 108 is operatively connected with the LIDAR detector array 102 for directing returns 103 of the broad beam from the scene 101 to the LIDAR detector array.

The first beam steering mechanism 106 includes a first rotating prism, wherein the second beam steering mechanism 108 includes a second rotating prism that is co-aligned with the first rotating prism. The first beam steering mechanism 106 includes a first Risley prism pair optically coupled to the broad laser emitter 104 for steering the beam from the broad laser emitter 104 over a conical field of regard. The second beam steering mechanism includes a second Risley prism pair optically coupled to the LIDAR detector array 102, at least one prism of which is co-aligned with the first Risley prism pair for directing returns 103 of the broad beam from the seen to the LIDAR detector array 102.

The first and second beam steering mechanisms 106 and 108 include position measuring systems 110, 112 operatively connected thereto for generating positional data to associate with returns 103 of the broad beam detected by the LIDAR detector array 102. Position measuring systems detect prism positions for at least one prism in the first and second Risley prism pairs. The prism positions become part of the LIDAR data together with time of flight data from the LIDAR detector array 102.

An alignment controller 114, or scanner control system, is operatively connected to the first and second beam steering mechanisms 106 and 108 to control beam scanning and maintain alignment of the LIDAR detector array 102 and the broad laser emitter 104. The two-way arrows in FIG. 1 indicate connections for positional data and command signals to and from the beam steering mechanisms 106 and 108 and a processing system 116 that includes the controller 114. The processing system 116 also includes A LIDAR controller 118 that is operatively connected, as indicated by the double arrows in FIG. 1, to the LIDAR detector array 102 and to the broad laser emitter 104 for controlling LIDAR actuation such as the timing for firing LIDAR flashes and timing the time of flight on laser returns 103 from the scene 101. An inertial navigation system (INS) 120 including sub-systems such as a global positioning system (GPS) 122 and an inertial measurement unit (IMU) 124 is operatively connected to the LIDAR detector array 102 by way of processing system 116 for generating geo-location data to associate with returns 103 of the broad beam 102. Processing system 116 can be a real-time computer that is operatively connected, as indicated by the arrow lines in FIG. 1, to the LIDAR detector 102 for alignment or merging of metadata with received LIDAR data. Processing system 116, LIDAR detector array 102, broad laser emitter, and the first and second beam steering mechanisms 106 and 108 can all be mounted to a platform 126 such as an airframe or a module configured to be mounted to an airframe.

One or more context imaging modules can optionally be included, operatively connected to be controlled by and provide data to processing system 116 to provide context data associated with the LIDAR data. Each imaging module can include fixed optics 128 and an focal plane array 130 (FPA) for a first context imager (e.g., a SWIR, VIS context imager for short wave infrared and visual imaging and LWIR context imager with a LWIR FPA 132 for long wave infrared imaging), and a gimbal 134. A metadata/sensor data merge module 136 of processing system 116 can match LIDAR data with its associated metadata from the context imaging modules and INS 120. Module 136 associates geo-location data with the LIDAR data to generate a raw 3-d point cloud with all metadata required for geo-registration of detected LIDAR points.

A method of generating LIDAR data includes directing a laser beam from a wide beam laser emitter 104 through a first beam steering mechanism 106 to scan a scene 101, e.g., over a conical field of regard. The method includes directing returns 103 of the laser beam from the scene 101 with a second beam steering mechanism 108 to a LIDAR detector array 102, generating time of flight data for returns 103 of the laser beam for a plurality of detector points in the LIDAR detector array 102 for each pulse of the laser beam. The method includes detecting positional data regarding the first and second beam steering mechanisms, e.g., from position measuring systems 110 and 112, and associating the positional data with the time of flight data to generate LIDAR data.

LIDAR data 138 is the output of the processing system 116 as georeferenced 3D points. It can also include context image data. Command and Control (C/C) 140 is used to change the state of the processing system 116. This may include starting and stopping the processing system 116, requesting to change the scan rate, changing imaging settings, or the like.

The field-of-view (FOV) using systems and methods as disclosed herein is increased relative to traditional flash LIDAR systems due to scanning the broad laser beam over a scene. Because the laser emitter can track the detector, the FOV of the laser emitter does not need to be increased nor does the laser power output need to be increased relative to traditional flash LIDAR systems. The alignment or merging of metadata and LIDAR data can ensure accuracy, e.g., quality, of geo-registration data points. This aids the accuracy of the system and reduces the burden on downstream processing, such as noise reduction filtering.

The methods and systems of the present disclosure, as described above and shown in the drawings, provide for LIDAR systems with superior properties including wider field-of-view and/or field-of-regard, and accuracy of geo-registration compared to traditional LIDAR systems. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A hybrid LIDAR system comprising:
   a flash-based LIDAR detector array;
   a broad laser emitter operatively connected to the LIDAR detector array for flash-based LIDAR sensing;
   a first beam steering mechanism operatively connected with the broad laser emitter for scanning a scene with a broad beam from the broad laser emitter, wherein scanning the scene with the broad beam from the broad laser emitter generates time of flight data for returns of the broad beam for a plurality of detector points in the LIDAR detector array for each scanning pulse of the broad beam wherein the time of flight varies for each pulse from a first detector point to a second detector point to form 3-dimensional data representing the scene for each scanning pulse; and
   a second beam steering mechanism operatively connected with the LIDAR detector array for directing returns of the broad beam from the scene to the LIDAR detector array, wherein the first beam steering mechanism includes a first Risley prism pair for steering the beam from the broad laser emitter over a conical field of regard.

2. The system as recited in claim 1, wherein the first beam steering mechanism includes a first rotating prism, wherein the second beam steering mechanism includes a second rotating prism that is co-aligned with the first rotating prism.

3. The system as recited in claim 1, wherein the second beam steering mechanism includes a second Risley prism pair that is co-aligned with the first Risley prism pair for directing returns of the broad beam from the seen to the LIDAR detector array.

4. The system as recited in claim 1, further comprising a position measuring system operatively connected to at least one of the first beam steering mechanism and/or the second beam steering mechanism for generating positional data to associate with returns of the broad beam detected by the LIDAR detector array.

5. The system as recited in claim 1, further comprising an alignment controller operatively connected to the first beam steering mechanism and to the second beam steering mechanism to maintain alignment of the LIDAR detector array and the broad laser emitter.

6. The system as recited in claim 1, further comprising a LIDAR controller operatively connected to the LIDAR detector array and to the broad laser emitter for controlling LIDAR actuation.

7. The system as recited in claim 1, further comprising an inertial navigation system (INS) operatively connected to the LIDAR detector array for generating geo-location data to associate with returns of the broad beam.

8. The system as recited in claim 1, further comprising a real-time computer operatively connected to the LIDAR detector for alignment of metadata with received LIDAR data.

9. A hybrid LIDAR system comprising:
   a platform;
   a flash-based LIDAR detector array mounted to the platform;
   a broad laser emitter mounted to the platform and operatively connected to the LIDAR detector array for flash-based LIDAR sensing;
   a first Risley prism pair mounted to the platform and optically coupled to the broad laser emitter for scanning a scene with a broad beam from the broad laser emitter, wherein scanning the scene with the broad beam from the broad laser emitter generates time of flight data for returns of the broad beam for a plurality of detector points in the LIDAR detector array for each scanning pulse of the broad beam wherein the time of flight varies for each pulse from a first detector point to a second detector point to form 3-dimensional data representing the scene for each scanning pulse;
   a second Risley prism pair mounted to the platform and optically coupled to the LIDAR detector array for directing returns of the broad beam from the scene to the LIDAR detector array;
   a first beam steering mechanism operatively connected with the broad laser emitter for scanning a scene with a broad beam from the broad laser emitter;
   at least one controller operatively connected to the first and second Risley prism pairs to maintain alignment of the LIDAR detector array and the broad laser emitter and to control LIDAR actuation;
   at least one sensor subsystem operatively connected to the platform for generating metadata associated with returns of the broad beam detected by the LIDAR detector array;
   a real-time computer operatively connected to the at least one sensor subsystem and to the LIDAR detector array to associate metadata from the at least one sensor subsystem with LIDAR data from the LIDAR detector array; and
   wherein the first beam steering mechanism includes a first Risley prism pair for steering the beam from the broad laser emitter over a conical field of regard.

* * * * *